United States Patent [19]

Kassal

[11] 4,107,109

[45] Aug. 15, 1978

[54] REACTIVE COMPOSITIONS AND POLYMERS MADE THEREFROM

[75] Inventor: Robert James Kassal, Wilmington, Del.

[73] Assignee: E. I. Du Pont de Nemours and Company, Wilmington, Del.

[21] Appl. No.: 780,089

[22] Filed: Mar. 22, 1977

[51] Int. Cl.$^2$ .................... C08C 19/28; C08F 253/00; C08F 255/04; C08F 255/06

[52] U.S. Cl. ................................ 260/4 R; 260/875; 260/878 R; 260/879; 260/881; 260/885; 260/886

[58] Field of Search .............. 260/4 R, 878 R, 879, 260/881, 885, 886, 875

[56] References Cited

U.S. PATENT DOCUMENTS

| | | | |
|---|---|---|---|
| 3,179,715 | 4/1965 | Natta et al. | 260/878 |
| 3,489,822 | 1/1970 | Witt et al. | 260/878 |
| 3,538,192 | 11/1970 | Bishop, Sr. | 260/878 R |
| 3,557,253 | 1/1971 | Sugimoto et al. | 260/878 R |
| 3,770,490 | 11/1973 | Parker | 260/885 |
| 3,819,765 | 6/1974 | O'Shea | 260/878 R |
| 3,835,088 | 9/1974 | Takamiya et al. | 260/875 |
| 3,875,260 | 4/1975 | Patel et al. | 260/878 R |
| 3,886,233 | 5/1975 | Visseren | 260/878 R |
| 3,949,019 | 4/1976 | Zeitler et al. | 260/878 R |
| 3,998,912 | 12/1976 | Zeitler et al. | 260/878 R |
| 4,007,234 | 2/1977 | Schuddemage et al. | 260/878 R |

FOREIGN PATENT DOCUMENTS 53-6990  8/1975  Japan.

*Primary Examiner*—Alan Holler

[57] ABSTRACT

A reactive composition comprising a solution of about 25–65% by weight of an uncured elastomer in about 35–75% by weight of polymerizable vinyl monomer and a free radical peroxide polymerization initiator. The reactive composition is polymerized under anaerobic conditions without solvent to form a graft copolymer wherein the elastomer is in a continuous phase and the resinous vinyl polymer functions as a reinforcing filler. The resulting graft copolymer has a tensile modulus of at least about 5 MPa at 200% elongation and 1.0 MPa at 50% elongation.

20 Claims, No Drawings

REACTIVE COMPOSITIONS AND POLYMERS MADE THEREFROM

BACKGROUND OF THE INVENTION

This invention relates to novel reactive compositions of an elastomer dissolved in a vinyl monomer and graft copolymers prepared therefrom that are especially tough elastomers.

The art is replete with compositions comprising mixtures of plastic resins and elastomeric materials. Many commonly used plastics such as poly(styrene), poly(methacrylate), the nylon resins, and so on, are subject to brittle fracture in their unmodified form, and it has become common to compound such resins with various proportions of rubber-like polymers to improve their resistance to breaking as the result of sharply applied stress. The sophistication of this art has also extended to the employment of elastomeric polymers that form ionic, covalent, or Van der Wals bonds with the host resin, it having been found that improvement of impact strength is even greater if some bonding occurs between the resin and the elastomeric toughening agent. Among the many patents describing such compositions, U.S. Pat. Nos. 3,489,822, 3,819,765 and 3,886,233 can be mentioned as representative. These patents describe compositions wherein minor amounts of ethylene-propylene (EP) copolymers or ethylene-propylene-diene (EPDM) elastomers are reacted with polymerizable monomers, such as styrene and acrylonitrile, to form grafted copolymers.

Elastomers are vulcanized with a great variety of chemicals, depending on the composition of the host polymer. Sulfur and its compounds, various organic compounds, metal oxides and hydroxides, and a variety of organic peroxides are commonly used. U.S. Pat. No. 3,179,715 teaches that EP copolymers can be vulcanized by a co-curing reaction in mixtures containing about 5% to 29% styrene or divinylbenzene under the influence of organic peroxide free radical initiators to give a fairly tough rubber.

The compounding and vulcanization of elastomers in conventional commercial practice is a complex process, involving mixing of polymer, fillers and curing agents in large and expensive equipment, processing on sheet-off mills, preparation of preformed portions of the resulting stock, and finally vulcanization at high temperatures in compression molding equipment. There is a great desire in the rubber industry to make greater use of the less complex injection molding methods normally used for fabricating objects of the thermoplastic resins by the plastics industry. Progress has been made in this direction by employing reactive materials such as the liquid isocyanate elastomers, which are mixed with curing and extending compounds in the course of injection molding to form polyurethane products. This process is known as liquid injection molding (LIM) or liquid reaction molding (LRM) and is described in, among other places, "Rubber Age", July 1975, pages 46-48. This type of system is used for forming polyurethane parts, for instance, and requires precise control of the metering of two or more reaction streams because proper stoichiometry of the reactants must be maintained. An analogous process using highly reactive but more conventional rubber compositions such as specially compounded SBR or EPDM rubbers of a less fluid nature is known as reaction injection molding (RIM). This process requires especially heavy duty processing equipment because of the high viscosity of the high molecular weight elastomers which are the major components of the compositions employed. One apparatus suitable for processing such compositions is described in U.S. Pat. No. 3,878,285 to Souffie. There is a need in the industry for less complex, less costly, and more easily processable compositions that can be used in the LIM and thermoset injection molding processes to give tough, high quality reinforced rubber objects.

SUMMARY OF THE INVENTION

It has now been discovered that stable reactive compositions can be made by dissolving an uncured elastomer in a polymerizable vinyl monomer. These reactive compositions remain stable when stored at ambient temperatures for extended periods of time. Subsequently, the reactive compositions can be heated to cause polymerization of the solution to a solid, tough elastomeric rubber. The novel reactive compositions comprise a solution of about 25–65% by weight, preferably 30–50% by weight, of an uncured elastomer, selected from the groups consisting of ethylene/higher α-olefin copolymers; natural rubber; ethylene/ethyl acrylate copolymers; styrene butadiene rubber; ethylene/vinyl acetate copolymers; polyisobutylenes; or polychloroprene, solubilized in 35–75% by weight, preferably 50–70% by weight, of a polymerizable vinyl monomer capable of dissolving said elastomer and a thermally activatable free-radical peroxide polymerization initiator. Preferably, the elastomer is an ethylene/propylene copolymer, optionally containing one or more nonconjugated dienes, and most preferably wherein the copolymer has an ethylene content of from about 50–80% by weight, most preferably 60–80% by weight, ethylene units. Any polymerizable vinyl monomer capable of solubilizing or dissolving in the uncured elastomer can be used in the reactive composition. The preferred polymerizable vinyl monomers are styrene, substituted styrenes, vinyl toluene, acrylic acid, methacrylic acid and esters thereof, vinyl acetate, acrylonitrile, and methacrylonitrile. The compositions are prepared by adding, in any order, elastomer, peroxide initiator, and polymerizable vinyl monomer to a vessel and mixing until the elastomer is in solution in the vinyl monomer. The resulting solution is a stable reactive composition that can be polymerized by heating into a tough, elastomeric graft copolymer wherein the elastomer is in the continuous phase and the resinous vinyl polymer forms a separate and discreet phase that functions as a reinforcing filler. More particularly, a graft copolymer made by injecting a solution of about 25–65% by weight of an uncured elastomer selected from the group consisting essentially of ethylene/higher α-olefin copolymers; natural rubber, ethylene/ethyl acrylate copolymers; styrene butadiene rubber; ethylene/vinyl acetate copolymers; polyisobutylenes; or polychloroprene, solubilized in about 35–75% by weight of a polymerizable vinyl monomer capable of dissolving said elastomer and a free radical peroxide polymerization initiator into a mold cavity and heating the solution to about 120°–180° C for about 2–40 minutes under anaerobic conditions without solvent for the reactants to obtain a graft copolymer wherein the vinyl monomer graft polymerizes on the elastomer, said elastomer being a continuous phase and the resinous vinyl polymer is a separate phase that functions as a reinforcing filler, thus resulting in a grafted copolymer having a tensile modulus in the absence of inorganic fillers of at least about 1.0 MPa at 50% elongation. The resulting graft copolymer consists essentially of an elastomer selected from the group consisting of ethylene/higher α-olefin copolymers; natural rubber; ethylene/ethyl acrylate copolymers; styrene butadiene rubber; ethylene vinyl acetate copolymers; polyisobutylenes; or polychloroprene comprising a continuous phase and resinous vinyl polymer which is a separate phase grafted to said elastomer that functions as a reinforcing filler, said grafted copolymer having a tensile modulus of at least about 5 MPa, preferably at least about 7 MPa at 200% elongation and at least about 1.0 MPa at 50% elongation.

DETAILED DESCRIPTION OF THE INVENTION

The reactive compositions are prepared by mixing at ambient temperatures 25–65% by weight uncured elastomer, 35–75% by weight polymerizable vinyl monomer and a thermally activatable free radical peroxide polymerization initiator. The uncured elastomers that are dissolved in the polymerizable monomer include ethylene/higher α-olefin copolymers, optionally containing one or more nonconjugated dienes. Generally, the amount of ethylene, higher α-olefin, nonconjugated dienes present in the copolymer is, by weight, 25–80% ethylene, 60–20% higher α-olefin and the balance nonconjugated diene. Usually, the higher α-olefin is propylene but other olefins such as 1-butene, 4-methyl-1-pentene, 1-pentene, 1-heptene, and 1-decene can also be used. The nonconjugated dienes containing only one terminal double bond are, generally, acyclic dienes containing 6–22 carbon atoms, 1,4-hexadiene, ethylidenenorbornene, cyclopentadiene, 1,4-heptadiene, and 5-methylene-2-norbornene. Copolymers may also contain a second nonconjugated diene having two terminal double bonds, such as 1,7-octadiene, 1,4-pentadiene, 5-(5-hexenyl)-2-norbornene and norbornadiene. These copolymers are described in U.S. Pat. Nos. 2,933,480, 3,260,708 and 3,819,591.

One especially useful composition contains an uncured ethylene/higher α-olefin copolymer containing 60–80% by weight ethylene units. When such copolymer in particulate form is mixed with a polymerizable vinyl monomer, such as styrene, and heated briefly, e.g., 5–30 minutes, to a moderate temperature such as 50°–60° C, a solid solution of a free-flowing particulate composition is obtained wherein the vinyl monomer remains in monomeric form. By solid solution is meant a homogeneous composition containing monomer imbibed in the high molecular weight polymer that is solid at temperatures up to about 60° C but that is easily converted to a more fluid, readily injection moldable state when heated to processing temperatures of about 65° C or more depending on the particular composition employed. Such reactive compositions are easy to handle and can be readily polymerized at temperatures of 120°–180° C.

Other suitable elastomers include natural rubber, butadiene/styrene polymers (SBR), polychloroprene (neoprene), ethylene/vinyl acetate copolymers, polyisobutylenes, and ethylene/ethyl acrylate copolymers. Such uncured elastomers are well known in the art. Ethylene/ethyl acrylate elastomers are disclosed in U.S. Pat. No. 3,904,588.

The polymerizable vinyl monomer used in formulating the reactive composition must be capable of forming a liquid or solid solution with the uncured elastomer. A variety of vinyl monomers can be used, such as, for example, styrene, vinyltoluene and other substituted styrene monomers containing substituents on the aromatic ring, acrylic acid, methacrylic acid and esters thereof, vinyl acetate, acrylonitrile, methacrylonitrile and mixtures thereof, especially styrene-acrylonitrile, styrene-methacrylic acid and styrenemethyl methacrylate. Excellent results are obtained when monomeric styrene or styrene-methacrylic acid mixtures are used.

The thermally activatable free radical peroxide polymerization initiators used with the vinyl monomer can be added to the composition in amounts of from 0.1–5%, usually 0.5–2% by weight of total polymeric composition. The peroxide used should be capable of polymerizing the vinyl monomer and initiating the graft copolymerization. Peroxide-type polymerization catalysts having the formula ROOR' where R is an organic radical and R' is an organic radical or hydrogen can be used. Representative examples include ditertiary butyl peroxide, tertiary butyl hydroperoxide, tertiary butyl perbenzoate, dicumyl peroxide, 2,5-dimethyl-2,5-bis(t-butyl peroxy)hexyne-3. The reactive compositions obtained by mixing at ambient temperature the uncured elastomer containing a free radical peroxide initiator and polymerizable vinyl monomer result in a stable, easy to handle solution that can be polymerized to a tough, elastomeric copolymer. The loss of solubility of the copolymer indicates that grafting of the vinyl monomer onto the copolymer has taken place. Quite advantageously these stable reactive solutions can be molded by LIM and conventional thermoset molding techniques. Reactive compositions prepared from ethylene/higher α-olefin copolymers having at least 60% by weight ethylene units are especially preferred because such compositions are free-flowing particulate solid solutions that are most convenient to use in injection molding operations.

Conventional cross-linking aids used with peroxide initiators can be employed in the polymerization reaction and include polyunsaturated compounds such as m-phenylenebis-maleimide, triallyl cyanurate, triallylisocyanurate, divinylbenzene and the like.

Polymerization and curing of the reactive solution is accomplished simultaneously by heating the solution to temperatures of about 120°–180° C, usually 140°–170° C, for about 2–40 minutes, depending on the activity or half-life of the initiator. The reactive solution is injection molded and polymerization is conducted in a mold cavity under anaerobic conditions without solvent. The resulting polymerized cured copolymer is a graft copolymer wherein the elastomer forms a continuous phase and the polymerized resinous vinyl polymer, e.g., polystyrene, forms a discreet phase. The graft copolymer has the characteristics of an elastomer in spite of the fact that a large portion of the graft copolymer is composed of non-elastomeric units. The resinous phase formed from the vinyl polymer acts as a reinforcing filler conferring surprisingly high tensile modulus and ultimate strength on the cured product. The graft copolymers made by the process of this invention have a tensile modulus of at least about 5 MPa, usually 7 MPa, at 200% elongation, and at 50% elongation of tensile modulus of at least about 1.0 MPa, all in the absence of inorganic fillers. Many copolymers have a 200% tensile modulus of the order of 25–30 MPa.

Injection molding is accomplished on an injection molding machine suitable for molding thermosetting materials. Compounds to be molded may contain an internal release agent such as stearic acid. In addition, the mold can be sprayed with inert release agents. The barrel of the molding machine is heated above 65° C but below the temperature at which the chosen peroxide initiator rapidly decomposes. The compound is injected into a mold cavity heated to 120°–180° C and maintained under pressure until the part has cured, i.e., 2–40 minutes. Following the cure, the mold is opened and the part is stripped from the mold and allowed to cool.

Compounding ingredients such as fillers, pigments, extenders, internal lubricants, etc., can also be advantageously employed in the polymerization process.

The graft copolymers of this invention can be used in many applications where ethylene/higher α-olefin copolymers, e.g., EPDM's and SBR, have been used in the vulcanized state. Exemplary uses are in molded products, and fascia or sight-shields for automobiles and shoe components. The exact manner of fabricating such goods is apparent to one skilled in the art.

This invention will now be described in connection with the following examples of specific embodiments thereof wherein parts and percentages are by weight unless otherwise indicated.

EXAMPLES

Materials Used

Polymers (all percentages by weight)

EPDM A. A terpolymer of 42% propylene, 3.3% 1,4-hexadiene, and the remainder ethylene having a Mooney Viscosity $ML_4$(250° F) of 18 ± 4.

EPDM B. EPCAR 585, a terpolymer of ethylene, propylene, and ethylidene norbornene having a Mooney Viscosity $ML_8$ (212° F) of 50, made by the B. F. Goodrich Chemical Co.

EPDM C. A tetrapolymer of 30% propylene, 4.4% 1,4-hexadiene, 0.4% norbornadiene and the remainder ethylene.

EPDM D. A terpolymer of 26% propylene, 2.7% 1,4-hexadiene, and the remainder ethylene having a Mooney Viscosity $ML_4$ (250° F) of 60.

NR. Natural Rubber.

SBR 1500. A standard type of styrene/butadiene rubber.

Neoprene WM-1. A polychloroprene rubber made by E. I. du Pont de Nemours and Co.

EA rubber. A copolymer of 54.3% methylacrylate, 4% methyl hydrogen maleate, and the remainder ethylene of Melt Index 9.7.

M — Stock Solution M = 40% EPDM A containing 1% HVA-2 plus 2% Peroxide C, in 60% Monomer S plus 1 pph Peroxide A.

Monomers

S — Styrene
MA — Methacrylic acid
MMA — Methyl methacrylate
BMA — Butyl methacrylate
VAC — Vinyl acetate
AN — Acrylonitrile Peroxides Peroxide A — t-butyl perbenzoate
Peroxide B — Lupersol 130, 2,5-dimethyl-2,5-bis(t-butylperoxy)hexyne-3.
Peroxide C — Luperco 130XL, 45% of Peroxide B absorbed on 55% $CaCO_3$.

Curing Aids

HVA-2 — m-phenylene-bis-maleimide
DVB — divinylbenzene
HMTA — hexamethylene tetramine Procedures Tensile properties — ASTM 412
Tear strength — ASTM D-624, Die C
$\eta_{inh}$ (Inherent viscosity, Polymer A) 0.1 g/100 ml in tetrachloroethylene at 85° C.
Clash-Berg Stiffness Temperature — ASTM 1043.

EXAMPLE 1

A sample of EPDM A, $\eta_{inh}$ nominally 1.66, was cracked by subjecting it to high temperature in a Kenics mixer. $\eta_{inh}$ of the cracked polymer was 0.88. A solution of 40% of this polymer in 60% styrene monomer was prepared and then catalyzed with 1% Peroxide A and 0.5% Peroxide C and containing 0.5% HVA-2. The solution was poured into a "Teflon"-lined mold, the mold was closed and placed in a heated press for 15 min. at 160° C under anaerobic conditions to effect polymerization. The product was a rubbery solid, 65 Shore A hardness, tensile strength 9.8 MPa, 190% elongation and the elastomer was the continuous phase. The tensile modulus of the graft copolymer at 50% elongation is 3.5 MPa.

EXAMPLES 2–19

Procedure

Solutions of other amorphous polymers were prepared by rolling in a sealed container the required amount of polymer, monomers and initiators. To facilitate dispersion, Peroxide C and HVA-2, if used, were usually predispersed in the elastomer on a rubber mill. In the case of very viscous solutions, the samples were further mixed by hand or in a sigma mixer. The graft copolymers were formed by polymerizing the composition in a mold cavity under anaerobic conditions at the temperature and time indicated in Table I. The samples were press cured using the procedure of Example 1. Examination shows the elastomer to be in a continuous phase. Table I illustrates the types of polymer and monomer mixtures prepared and results obtained.

TABLE I

| Ex. | Composition | Molding Condition | Shore Hardness | Tensile Strength MPa | % Elongation | Tear Strength kN/m | Clash-Berg Temp ° F. | % Comp. Set 22 hr + 70° C | 200% Modulus MPa | 50% Modulus MPa |
|---|---|---|---|---|---|---|---|---|---|---|
| 2 | 30% of EPDM A containing 2% Peroxide C and 1% HVA-2, 70% S and 1 part Peroxide A | 20 min at 160° C | 84A | 16.4 | 205 | 24.3 | −58 | 38 | 15.5 | 5.8 |
| 3 | Same as Ex. 2, with 40% EPDM A and 60% S | " | 73A | 14.0 | 370 | 39.4 | −62 | 51 | 13.0 | 2.5 |
| 4 | Same as Ex. 2, with 50% EPDM A and 50% S | " | 68A | 16.7 | 495 | 30.1 | −62 | 39 | 8.3 | 1.7 |
| 5 | 35% EA rubber, 65% S, 1% each Peroxide B and HVA-2 based on | 20 min at 160–170° C | 91A | 15.4 | 105 | 36.4 | +27 | 88 | — | 11.7 |

TABLE I-continued

| Ex. | Composition | Molding Condition | Shore Hardness | Tensile Strength MPa | % Elongation | Tear Strength kN/m | Clash-Berg Temp °F. | % Comp. Set 22 hr + 70° C | 200% Modulus MPa | 50% Modulus MPa |
|---|---|---|---|---|---|---|---|---|---|---|
| 6 | Same as Ex. 5, except 50% EA rubber and 50% S | " | 73A | 11.1 | 300 | 30.3 | +18 | 71 | 7.9 | 4.4 |
| 7 | 50% NR containing 1% HVA-2, 2% Peroxide C, 50% S plus 1 pph Peroxide A | 20 min at 175° C | 69A | 19.6 | 390 | 41.8 | −64 | 54 | 8.9 | 4.3 |
| 8 | 38.1% EPDM A, 57.1% S, 4.8% MA | 20 min at 170° C | — | 21.0 | 205 | — | −57 | — | 21.5 | 12.4 |
| 9 | Same as Ex. 8, except 4.8% MMA | " | — | 16.2 | 190 | — | −57 | — | — | 7.6 |
| 10 | Same as Ex. 8, except 4.8% BMA | 20 min at 170° C | — | 15.5 | 140 | — | −53 | — | — | 8.9 |
| 11 | 39.2% EPDM A, 58.8% S, 2% DVB | " | — | 12.2 | 65 | — | −52 | — | — | 10.3 |
| 12 | 36.4% EPDM A, 54.5% S, 9.1% DVB | " | — | 10.8 | 35 | — | −31 | — | — | — |
| 13 | 40% EPDM A, 60% S, and 1.5 pph Peroxide A | 20 min at 160–170° C | 71A | 17.1 | 290 | 36.2 | −58 | 33 | 16.9 | 4.3 |
| 14 | 40% EPDM B containing 1 pph HVA-2 and 2 pph Peroxide C plus 60% S con. 1% Peroxide A | 20 min at 170° C | 81A | 18.9 | 250 | 34.8 | −37 | 38 | 18.7 | 8.7 |
| 15 | 40% Neoprene WM-1 containing 1 pph HVA-2, 2 pph HMTA, 2.25 pph Thiuram M, 2 pph "Carbowax" 4000 4W plus 60% S and 1.5% Peroxide A | 30 min at 160° C | — | 11.7 | 390 | 54.6 | — | 71 | 8.1 | 5.0 |
| 16 | 50% Neoprene WM-1 containing 2% Peroxide C, 1% HVA-2, 50% S, 1% Peroxide A | 20 min at 160° C | — | 12.1 | 285 | — | +41 | — | 9.1 | 4.0 |
| 17 | 40% SBR-1500, 60% MMA, 1 pph Peroxide A | 30 min at 140° C | 76A | 24.9 | 250 | 38.7 | −43 | 38 | 19.1 | 3.0 |
| 18 | 40% EA Rubber containing 2.5% Peroxide A, 60% S | 20 min at 140° C | 82A | 11.0 | 270 | 17.9 | — | 96 | 11.7 | 11.0 |
| 19 | 40% SBR-1500 containing 1% HVA-2, 1.5% Peroxide C, 60% S | 20 min at 175° C | — | 16.7 | 230 | — | −50 | — | 16.2 | 11.5 |

EXAMPLE 20

A solution was prepared from 40 parts of EPDM A containing 4 pph zinc stearate, 60 parts styrene monomer and one part Peroxide A. Eighty parts of this solution and 20 parts ½ inch fiber glass were mixed in a sigma mixer and molded under anaerobic conditions at 170° C for 20 minutes. Properties of the product were: Shore Hardness, 91A; flexural modulus, 416 MPa; tensile strength, 8.1 MPa; elongation, <10%; permanent set, 3%; tear strength, 78.2 kN/m. The elastomer was in the continuous phase.

EXAMPLES 21–32

Procedure

The high ethylene, crystalline EPDM rubbers do not form liquid solutions with monomers such as styrene or methacrylates at ambient temperatures; therefore, a different procedure is required for preparation of these reactive compositions. The EPDM polymer is first banded on a rubber mill, then all additives such as fillers, peroxides, curatives, etc., are milled in. The polymer is sheeted off, allowed to cool and is then chipped or ground to about 10 mesh. The polymer is placed in a container, the desired amount and type of vinyl monomer added, and after sealing the container is placed on a roller and heated. Within about 30 minutes at 50–60° C the monomers are absorbed into the polymer to provide a free flowing, granular solid solution of monomer in uncured EPDM.

The elastomer compounds used in Examples 21–32 are prepared as follows: mill blends were prepared using the ratios as shown in the following table. The compounded stocks were then chipped to pass through a ⅛ inch screen and mixed with the vinyl monomer styrene to form a free flowing, particulate solid solution.

| | STOCKS A - I | | | | | | | | |
|---|---|---|---|---|---|---|---|---|---|
| | A | B | C | D | E | F | G | H | I |
| EPDM C | 100 | 100 | 100 | 100 | — | — | — | — | — |
| EPDM D | — | — | — | — | 100 | 100 | 100 | 100 | 100 |
| Camelwite[1] | 250 | — | — | — | 250 | — | — | — | — |
| Mistron Vapor[2] | — | 75 | — | — | — | 75 | — | — | — |
| Cab-o-sil[3] | — | — | 37.5 | — | — | — | 37.5 | — | — |
| Peroxide A | 2.5 —————————————————————→ | | | | | | | | |
| HVA-2 | 1.25 —————————————————————→ | | | | | | | | |
| Peroxide C | 1.25 —————————————————————→ | | | | | | | | |

[1] Calcium carbonate filler
[2] Magnesium silicate filler
[3] Fumed silica

Stocks A — I mixed with vinyl monomer are injection molded and polymerized under anaerobic conditions and under the molding conditions described in Table II to form tough graft copolymers wherein the elastomer is in a continuous phase.

TABLE II

| Ex. | Composition | Molding Condition | Shore Hardness | Tensile Strength MPa | % Elongation | Tear Strength kN/m | % Comp. Set 22 hr. at 70° C | 200% Modulus MPa | 50% Modulus MPa |
|---|---|---|---|---|---|---|---|---|---|
| 21 | 177.5g Stock A, 75g S | 20 min at 170° C | D50 | 10.9 | 50 | 28.2 | 68 | — | 10.9 |
| 22 | 90g Stock B, 75g S | " | D44 | 11.2 | 107 | 37.1 | 86 | — | 9.0 |
| 23 | 71.3g Stock C, 75g S | " | D47 | 11.4 | 140 | 42.4 | 76 | — | 8.8 |
| 24 | 84g Stock D, 120g S | " | D43 | 17.7 | 200 | 47.3 | 54 | 18.0 | 9.0 |
| 25 | 177.5g Stock E, 75g S | " | D54 | 12.0 | 80 | 46.7 | 49 | — | 11.5 |
| 26 | 90g Stock F, 75g S | " | D48 | 14.5 | 200 | 66.3 | 52 | 14.4 | 8.9 |
| 27 | 71.3g Stock G, 75g S | " | D49 | 13.0 | 180 | 63.2 | 49 | — | 8.5 |
| 28 | 84g Stock H, 120g S | " | D46 | 20.0 | 230 | 66.0 | 50 | 19.4 | 6.9 |
| 29 | 40g Stock I, 60g of 20% MMA in S | " | D46 | 21.4 | 300 | 65.1 | 56 | 19.3 | 7.9 |
| 30 | 40g Stock I, 60g of 20% MA in S | " | D45 | 25.9 | 245 | 49.9 | 26 | 22.9 | 8.3 |
| 31 | 40g Stock H, 60g of 20% AN in S | 30 min at 140° C | A84 | 24.8 | 525 | 70.2 | 51 | 8.1 | 3.7 |
| 32 | 40g Stock H, 60g of 20% VAC in S | " | A87 | 9.8 | 315 | 62.4 | 47 | 10.5 | 5.5 |

I claim:

1. A stable reactive composition useful for making graft copolymers consisting essentially of a solution of about 25–65% by weight of an uncured elastomer selected from the group consisting of ethylene/higher α-olefin copolymers; natural rubber; ethylene/ethyl acrylate copolymers; stryene butadiene rubber; ethylene/vinyl acetate copolymers; polyisobutylenes; and polychloroprene solubilized in about 35–75% by weight of polymerizable vinyl monomer capable of dissolving said elastomer and a thermally activatable free radical peroxide polymerization initiator whereupon when said reactive composition is polymerized the elastomer forms a continuous phase and the resulting vinyl polymer forms a separate and discrete phase.

2. A free flowing, particulate stable reactive composition useful for making graft copolymers consisting essentially of a solid solution of about 25–65% by weight of an uncured ethylene/higher α-olefin copolymer elastomer containing 60–80% by weight ethylene units and about 35–75% by weight of polymerizable vinyl monomer capable of dissolving in said elastomer and a thermally activatable free radical peroxide initiator whereupon when said reactive composition is polymerized the elastomer forms a continuous phase and the resulting vinyl polymer forms a separate and discrete phase.

3. A reactive composition of claim 2 comprising about 30–50% by weight uncured elastomer.

4. A reactive composition of claim 3 containing 50–70% by weight polymerizable vinyl monomer.

5. A reactive composition of claim 4 wherein the uncured elastomer is an ethylene/propylene copolymer.

6. A reactive composition of claim 4 wherein the uncured elastomer is an ethylene/propylene/nonconjugated diene copolymer.

7. A reactive composition of claim 5 wherein the polymerizable vinyl monomer is styrene, vinyl toluene, acrylic acid, methacrylic acid and esters thereof, vinyl acetate, acrylonitrile, or methacrylonitrile.

8. A reactive composition of claim 5 wherein the polymerizable vinyl monomer is styrene.

9. A reactive composition of claim 5 wherein the free radical peroxide initiator is tertiary butyl perbenzoate, 2,5-dimethyl-2,5-bis(t-butylperoxy) hexyne-3, tertiary butyl peroxide or tertiary butyl hydroperoxide.

10. A process for manufacturing a graft copolymer which consists essentially of introducing a solution of about 25–65% by weight of an uncured elastomer selected from the group consisting essentially of ethylene/higher α-olefin copolymers; natural rubber, ethylene/ethyl acrylate copolymers; styrene butadiene rubber; ethylene/vinyl acetate copolymers; polyisobutylenes; and polychloroprene, solubilized in about 35–75% by weight of a polymerizable vinyl monomer capable of dissolving said elastomer and a free radical peroxide polymerization initiator into a mold cavity and heating the solution to about 120°–180° C for about 2–40 minutes under anaerobic conditions without solvent for the reactants to obtain a graft copolymer wherein the vinyl monomer graft polymerizes on the elastomer, said elastomer being a continuous phase and the resinous vinyl polymer is a separate phase that functions as a reinforcing filler, thus resulting in a grafted copolymer having a tensile modulus in the absence of inorganic fillers of at least about 1.0 MPa at 50% elongation.

11. A process of claim 10 wherein the ethylene/higher α-olefin copolymer is an ethylene/propylene copolymer.

12. A process of claim 11 wherein the copolymer contains 60–80% by weight ethylene units.

13. A process of claim 10 wherein the elastomer is polychloroprene.

14. A process of claim 10 wherein the elastomer is styrene butadiene rubber.

15. A process of claim 10 wherein the elastomer is natural rubber.

16. A process of claim 10 wherein the elastomer is an ethylene/ethyl acrylate copolymer.

17. A process of claim 10 wherein the polymerizable vinyl monomer is styrene, vinyl toluene, acrylic acid, methacrylic acid and esters thereof; vinyl acetate, acrylonitrile or methacrylonitrile.

18. A process of claim 10 wherein the peroxide polymerization initiator is tertiary butyl perbenzoate, 2,5-dimethyl-2,5-bis(t-butylperoxy) hexyne-3, tertiary butyl peroxide or tertiary butyl hydroperoxide.

19. A process of claim 11 wherein the polymerizable vinyl monomer is styrene.

20. A process of claim 10 wherein the elastomer is styrene butadiene rubber and the vinyl monomer is styrene.

* * * * *